O. C. HOFFMANN.
SWITCH OR JUNCTION BOX.
APPLICATION FILED DEC. 9, 1911.
1,026,164.
Patented May 14, 1912.
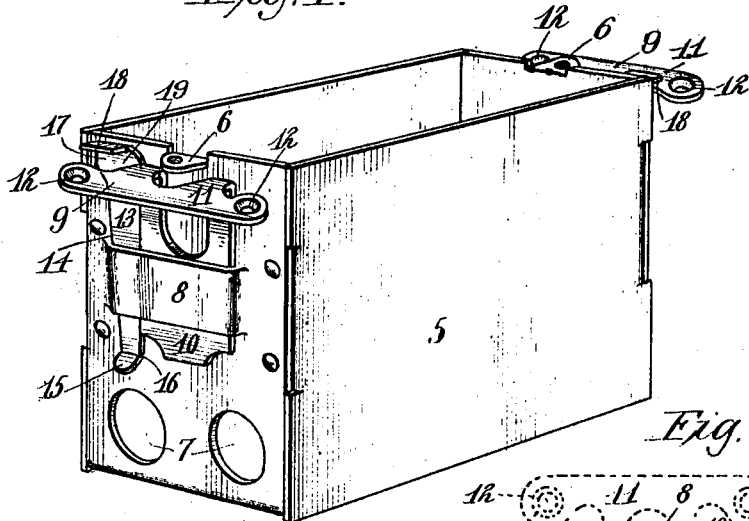
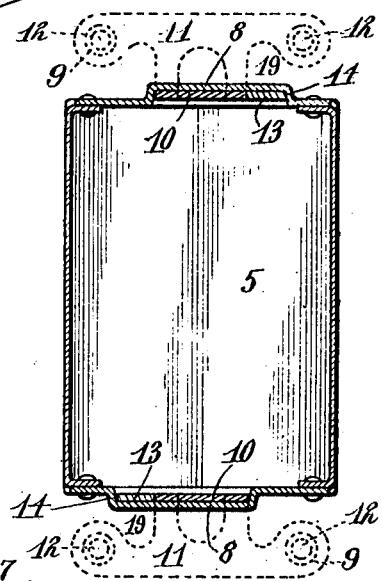
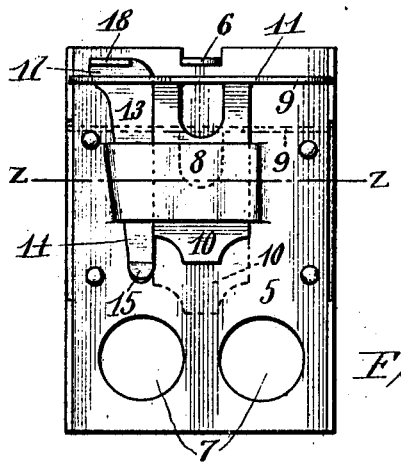
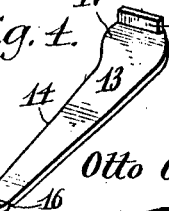
Witnesses:
Jacob Oberst, Jr.
Eda M. Schweiger.
Otto C. Hoffmann, Inventor.
By Emil Neuhart
Attorney.

UNITED STATES PATENT OFFICE.

OTTO C. HOFFMANN, OF BUFFALO, NEW YORK, ASSIGNOR TO CHAUNCEY R. HATCH, OF BUFFALO, NEW YORK.

SWITCH OR JUNCTION BOX.

1,026,164.   Specification of Letters Patent.   Patented May 14, 1912.

Application filed December 9, 1911. Serial No. 664,810.

*To all whom it may concern:*

Be it known that I, OTTO C. HOFFMANN, a citizen of the United States, residing at Buffalo, in the county of Erie and State of New York, have invented certain new and useful Improvements in Switch or Junction Boxes, of which the following is a specification.

My invention relates to switch or junction boxes of that type commonly employed in buildings equipped with electric lighting systems, and more particularly to the means for adjustably securing the same to the supporting structure.

The object of my invention is the provision of improved means for adjustably securing a switch or junction box in the wall of a room, and also to improve the construction of the box so that after being secured to the supporting structure, it may be easily adjusted to bring the edges of the side and end walls of the box flush with the face of the wall or in any other desired relation thereto.

Another object is the provision of adjusting means arranged wholly outside of the box so that it is easily accessible to enable the box to be adjusted on its supporting structure after the switch is placed therein without the necessity of removing the switch therefrom.

With these and other objects in view, my invention consists in providing a switch or junction box with adjustable securing means arranged wholly outside of the box.

It further consists in the novel construction of the securing means, and also in the construction, arrangement and combination of parts to be hereinafter described and particularly pointed out in the subjoined claims.

Switch or junction boxes are usually secured to the frame or supporting structure of a wall and are adjustable to permit of bringing the forward edges thereof approximately even with the surface of the wall. They are usually, and preferably for convenience, secured and the switch placed therein and connected before the wall is plastered and if adjusted before plastering, the plasterer must regulate the thickness of the plaster to the forward edges of the box, which is not practicable when perfect plastering is desired; nor economical, even if an uneven wall results therefrom and consequently the box is adjusted with reference to its securing means, now fixed, to bring the forward edges of the box in proper alinement with the surface of the plaster; but in order to do this, the switch must be disconnected from the circuit wire and removed from the box, as the means for adjusting, where adjustment is possible after plastering, is confined within the box and is not accessible except the switch is removed. By placing the adjustable securing means wholly without the box, it is easily adjustable after plastering without necessitating the removal of the switch and accurate adjustment can be made at any time after plastering, if required, and as the cover plate extends beyond all sides of the box, the securing means are concealed.

In the accompanying drawings, I have illustrated the preferred embodiment of my invention, in which—

Figure 1 is a perspective view of a switch or junction box. Fig. 2 is an end view of the same. Fig. 3 is a horizontal section taken on line z—z, Fig. 2. Fig. 4 is a detached perspective view of one of the lock wedges.

Reference now being had to the drawings by numerals, 5 designates the usual metallic box which is preferably of rectangular construction and may be of any size, depending on the condition under which it is to be used. As is common in boxes of this type, it is made of sheet metal bent to form the desired shape and may be made in one integral piece or of a number of blanks suitably connected. In this box is placed the usual switch which may be secured to the ears 6 at opposite ends of the box and in one or more walls of the box, openings 7 are formed through which the ends of circuit wires are passed for connection with the switch. When the switch is properly placed within the boxes and the circuit wires connected therewith, the usual face plate may be placed over the box and suitably attached, said face plate having the usual openings for the push-buttons of the switch to project therethrough, all of which is common in switch or junction boxes of this type. In two opposite walls of the box, preferably the end walls, I provide loops or clips 8 which are advisedly formed by slitting the sheet metal transversely in two lines and bulging out the metal therebetween. The loop is shaped so that at one end it is bulged out parallel with the sides of the box while at its other end it is beveled or tapered toward the bottom for a purpose to appear hereinafter.

Adjustably retained within the loops 8 and bearing against the walls from which the loops are stamped are brackets 9, each comprising a flat body portion 10 lying in contact with the wall and a securing flange 11 arranged at right angles to the body portion so as to stand out from the wall. These brackets may be of any suitable shape but are preferably made with the edges of each body portion 10 parallel and the flange of each bracket has openings 12 through which screws or other fastening device are passed to be driven into the supporting structure. The brackets are adjustable in lines extending from front to rear of the box and each is securely held after being adjusted by a retainer wedge 13 extending through the loop in which the bracket is placed. Each wedge has its beveled or tapered edge 14 in contact with the tapered end wall of its coöperating loop and its other edge in contact with its co-acting bracket and after adjusting the brackets to the points desired, each wedge is driven tightly into its retaining loop so that its opposite edges bind against the adjacent edge of the bracket and the tapered end wall of said loop, thus securely fastening the brackets as positioned. In order to prevent removal of the wedges the small or inner end thereof is bent outward a trifle, as at 15, and to enable this being done at a point near its extremity, after being placed in its coöperating loop, it is cut partly through the metal transversely to weaken it, as at 16, and when force is applied to the end, it will bend along the weakened portion thus formed. It is to be understood that the wedges are bent in this manner after being positioned in the loops and by thus weakening them there is no chance of bending any other part of the wedges out of straight line. They will therefore always be in perfect shape to perform the functions for which they are designed. The large or outer end of each wedge has an offset portion 17 and is also provided with an outstanding lip 18 between which and the adjacent edge of the securing flange 11 is a space 19. These lips provide convenient means for manipulating the retainer wedges and when they are in planes in rear of said securing flanges, it is simply necessary in loosening each wedge to insert a nail or other suitable device underneath the lip thereof and have it bear against the adjacent edge of the securing flange as a fulcrum.

By means of my invention, the brackets can be easily adjusted on the box and the box can as readily be adjusted with reference to the brackets when the latter are secured to the supporting structure, as the entire securing means is located outside of the box. The construction also permits of a very quick and accurate adjustment without the necessity of removing the box from the wall or the switch from the box after being once placed therein.

Having thus described my invention, what I claim is,—

1. A switch or junction box having loops on opposite walls, brackets adjustable in said loops, and retainer wedges co-acting with said brackets to hold the same in adjusted position.

2. A switch or junction box having brackets adjustably held thereon, and retainer wedges co-acting with said brackets to hold them in adjusted position.

3. A switch or junction box having integral loops on opposite walls, brackets adjustably fitting into said loops and having outstanding securing flanges, and a retainer wedge coacting with each bracket and movable within the loop into which its co-acting bracket fits.

4. A switch or junction box having loops on opposite walls, a bracket adjustable in each loop and having a securing flange at its outer end, retainer wedges in said loops engaging said brackets and having outstanding ears at this upper end.

5. A switch or junction box having loops on opposite walls, one end wall of each loop being tapered inward, a bracket adjustable in each loop and having a securing flange at its outer end, and retainer wedges fitting into said loops between the tapered walls thereof and the brackets therein.

6. A switch or junction box having loops on opposite walls, a bracket adjustable in each loop and having a securing flange at its outer end, and retainer wedges between said brackets and one of the ends of said loops and having offset outer ends and outstanding ears at said ends.

7. A switch or junction having loops on opposite walls, a bracket adjustable in each loop and having a securing flange at its outer end, and retainer wedges between said brackets and one of the ends of said loops, each retainer wedge having an incision near its inner end and its inner end portion bent outward from said incision to its extremity.

8. A switch or junction box having loops on opposite walls, brackets adjustable in said loops and in contact with the outer faces of said walls, and retainer wedges movable in said loops and impinging against said brackets to retain them in adjusted position, said retainer wedges lying in contact with the outer faces of said walls and having their inner ends bent outward and provided at their upper ends with outstanding ears.

In testimony whereof, I have affixed my signature in the presence of two subscribing witnesses.

OTTO C. HOFFMANN.

Witnesses:
  EMIL NEUHART,
  JACOB OBERST, Jr